United States Patent
Axelrod et al.

(10) Patent No.: US 9,226,480 B2
(45) Date of Patent: Jan. 5, 2016

(54) PET CHEW TOYS OF RUBBER AND POLYAMIDE, AND METHODS OF MANUFACTURE THEREOF

(71) Applicant: T.F.H. PUBLICATIONS, INC., Neptune City, NJ (US)

(72) Inventors: Glen S. Axelrod, Colts Neck, NJ (US); Ajay Gajria, Maharashtra (IN)

(73) Assignee: T.F.H. PUBLICATIONS, INC., Neptune City, NJ (US)

( * ) Notice: Subject to any disclaimer, the term of this patent is extended or adjusted under 35 U.S.C. 154(b) by 85 days.

(21) Appl. No.: 13/900,868

(22) Filed: May 23, 2013

(65) Prior Publication Data

US 2014/0345538 A1    Nov. 27, 2014

(51) Int. Cl.
*A61G 1/00* (2006.01)
*A01K 29/00* (2006.01)
*B29B 13/00* (2006.01)
*B29C 65/00* (2006.01)
*A01K 15/02* (2006.01)
*A01K 11/00* (2006.01)

(52) U.S. Cl.
CPC ............. *A01K 15/025* (2013.01); *A01K 15/026* (2013.01)

(58) Field of Classification Search
None
See application file for complete search history.

(56) References Cited

U.S. PATENT DOCUMENTS

| | | |
|---|---|---|
| 3,871,334 A | 3/1975 | Axelrod |
| 5,174,243 A | 12/1992 | O'Rourke |
| 6,274,182 B1 | 8/2001 | Axelrod et al. |
| 6,821,538 B2 | 11/2004 | Axelrod et al. |
| 2002/0179019 A1 | 12/2002 | Bonner |
| 2004/0089981 A1 | 5/2004 | Byrne |
| 2004/0137117 A1 | 7/2004 | Axelrod |
| 2005/0058822 A1 | 3/2005 | Ittel |
| 2006/0032459 A1 | 2/2006 | Jager |
| 2007/0238835 A1 | 10/2007 | Chen |
| 2009/0101079 A1 | 4/2009 | Axelrod |
| 2010/0152346 A1 | 6/2010 | Yang et al. |
| 2010/0203192 A1 | 8/2010 | Axelrod et al. |
| 2010/0224138 A1 | 9/2010 | Axelrod et al. |
| 2011/0169183 A1 | 7/2011 | Axelrod et al. |
| 2014/0130750 A1* | 5/2014 | Valle et al. .................... 119/708 |

OTHER PUBLICATIONS

International Search Report and Written opinion from corresponding PCT Appln. No. PCT/US14/37796 dated Oct. 10, 2014.
Lu et al., "The Study of Apparent Phase Diagram of Nylon 6/66/1212 Copolymer", 2004, China, pp. 20-21. English translation provided.

* cited by examiner

*Primary Examiner* — Ana Woodward
(74) *Attorney, Agent, or Firm* — Grossman, Tucker, Perreault, Pfleger, PLLC (57) ABSTRACT

A pet chew toy comprising a blend containing a polyamide terpolymer and a diene elastomer, wherein the diene elastomer is crosslinked and the polyamide terpolymer has a Tm in the range of 120° C. to 250° C.

19 Claims, 3 Drawing Sheets

PET CHEW TOYS OF RUBBER AND POLYAMIDE, AND METHODS OF MANUFACTURE THEREOF

FIELD OF THE INVENTION

The present disclosure relates to pet chew toys made of a polymer material composition comprising an elastomer, such as rubber, and polyamide terpolymer, as well as molding processes therefore.

BACKGROUND

Most dogs enjoy chewing on things, although preferences vary as to the hardness of the substances favored. Some dogs like to chew on very hard materials such as cow bones, wood and nylon, while others prefer softer chews such as polyurethane or rubber. Some dogs due to their age may not be able to chew on very hard substances. Young dogs may have insufficiently developed teeth, while old dogs may have diseased gums or may have lost some of their teeth.

Furthermore, chew toys may be used as a vehicle to provide interaction between dogs and people. For example, some people like to play fetch with chew toys. The interaction between animals and their owners has reportedly been found to be not only beneficial to the animal, as it provides the animal with necessary exercise and companionship, but beneficial to their owners as well, with many reported health related benefits.

Accordingly, the prior art is replete with disclosures directed at forming a variety of chew toys. However, there is still a need to provide chew toys that fulfill other requirements. For example, it may also be useful to provide animal chews that are interesting not only to animals, but to the animal owners as well. Additionally, it may also be useful to provide animal chews that enhance the feel of the chew to the animal or owner. Accordingly, an animal toy of novel construction may be directed to sparking the interest of, not only the animal, but children, teenage or adult owners, which may increase the time period that owners engage with their animals.

More particularly, it may be preferred that chew toys have a reasonable durability and maintain the interest of the animal for more than one interaction. Further, it may be preferred that such chew toys comprise one or more polymer compositions such that a variety of chewing experiences may be provided for the animal. Towards that end, if different compositions having different physical properties, such as hardness or different attractant properties, can be combined into a single pet chew toy, the animal may prefer one of the compositions over the other and remain interested in the chew toy for a longer time period.

SUMMARY

A pet chew toy comprising a blend containing a polyamide terpolymer and a diene elastomer, wherein said diene elastomer is crosslinked and said polyamide terpolymer has a Tm in the range of 120° C. to 250° C.

A pet chew toy comprising a blend containing a polyamide terpolymer and a diene elastomer, wherein the diene elastomer is crosslinked and the polyamide terpolymer comprises a terpolymer of the following three polyamide homopolymers:

The melting point of the polyamide terpolymer is 120° C. to 200° C. and the diene rubber comprises crosslinked cis-1,4-polyisoprene and wherein the polyamide terpolymer is present at 30% by weight to 95% by weight of the pet chew toy.

A pet chew toy comprising a central shaft portion between two end portions wherein a first material composition forms the end portions, wherein the first material composition comprises a blend containing a polyamide terpolymer and a diene elastomer, wherein the diene elastomer is crosslinked and the polyamide terpolymer has a Tm in the range of 120° C. to 250° C. The polyamide terpolymer is present at a level of 30% to 95% by weight of the pet chew toy and the diene elastomer is present at a level of 5% to 50% by weight of the pet chew toy. The central shaft section comprises a second material composition wherein the second composition comprises a blend containing a polyamide terpolymer and a diene elastomer wherein the diene elastomer is present at a level of greater than 50% by weight to 75% by weight of the pet chew.

A method of making a pet chew toy providing a first material composition comprising a blend containing a polyamide terpolymer and a diene elastomer wherein the diene elastomer is crosslinked and the polyamide terpolymer has a Tm in the range of 120° C. to 250° C. and has a first Shore Hardness. One may then provide a second material composition wherein the second material composition comprises a blend containing a polyamide terpolymer and a diene elastomer and having a second Shore durometer hardness, the first Shore durometer hardness is higher than said second Shore durometer hardness. One may then form two end portions of the pet chew toy with the first material composition in a first molding apparatus, wherein each of the two end portions includes an internal cavity and form a central shaft portion of the pet chew toy with the second material composition in a second molding apparatus, wherein the second material composition flows into the internal cavity of each end portion to join the central shaft portion to each end portion.

FIGURES

The above-mentioned and other features of this disclosure, and the manner of attaining them, will become more apparent and better understood by reference to the following description of embodiments described herein taken in conjunction with the accompanying drawings, wherein.

DETAILED DESCRIPTION

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Figure 1:
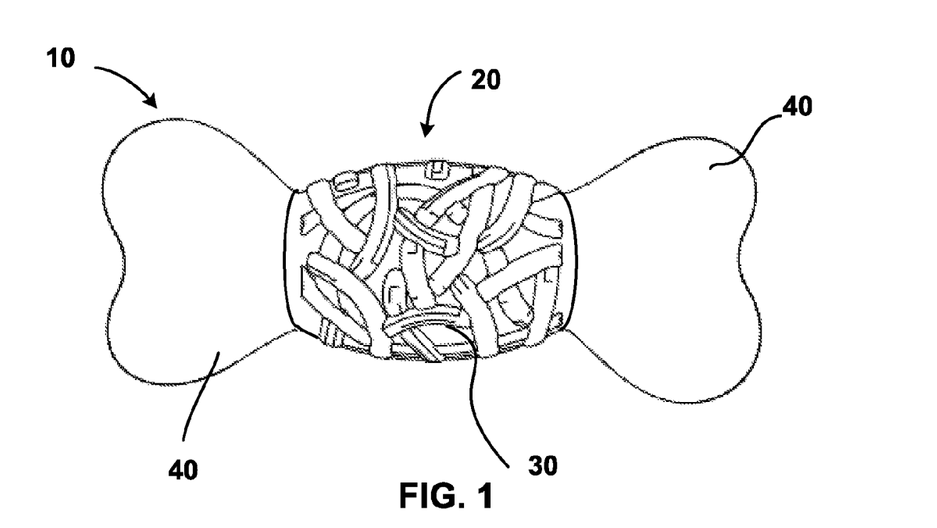
FIG. 1 is a front view of a pet chew toy 10 according to one embodiment of the present disclosure.
Figure 2:
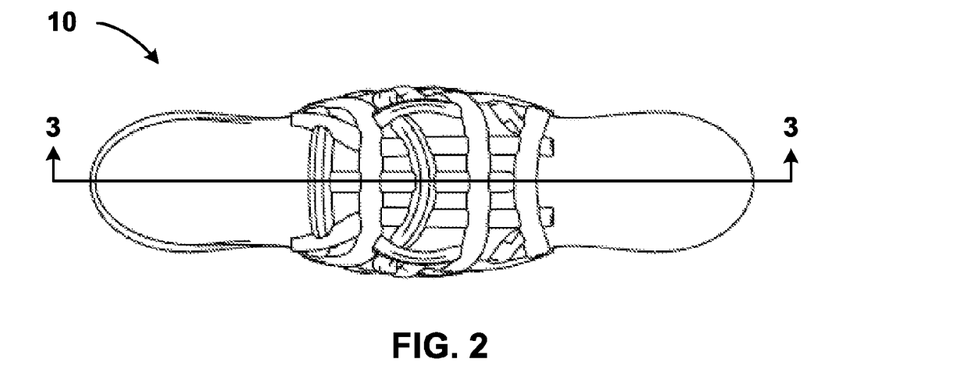
FIG. 2 is a side view of the pet chew toy 10 of FIG. 1.
Figure 3:
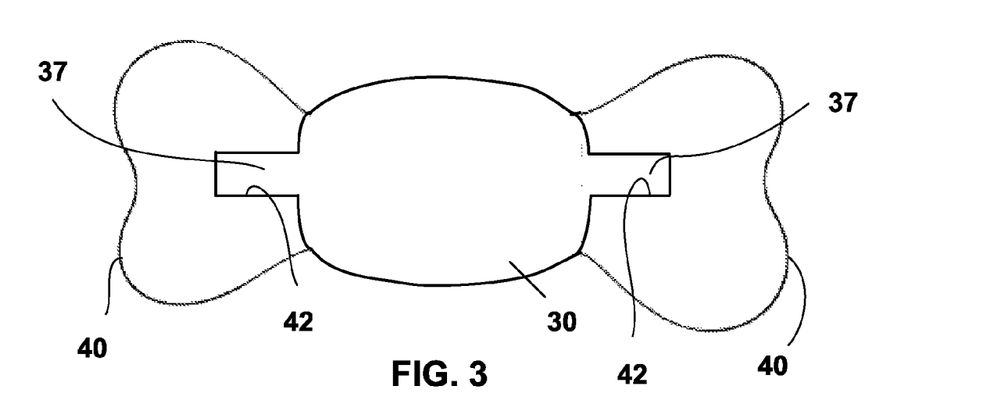
FIG. 3 is a cross-sectional view of the pet chew toy 10 of FIG. 1 taken longitudinally along line 3-3 of FIG. 2.

In an exemplary embodiment, as illustrated in FIGS. 1-3, a pet chew toy 10 according to the present disclosure may have an elongated body 20 in the shape of a bone, particularly having an elongated central shaft portion 30 which may be cylindrical. The pet chew toy 10 may further comprise at least one enlarged flanking end portion 40, which may simulate condyle portions of the bone. As such, with enlarged flanking end portion 40 at each end of the chew toy, the toy takes on the general shape of a barbell. As explained in greater detail below, central shaft portion 30 and flanking end portion(s) 40 may be particularly formed of two different material compositions, differing with regards to chemical composition and/or one or more physical properties. Stated another way, the central shaft portion 30 and flanking end portion(s) 40 are not necessarily formed of the same material composition.

As shown in FIG. 3, flanking end portion 40 may include an internal cavity 42 formed therein, which may be used to join with a projection 37 of the central shaft portion 30 during the formation of the pet chew toy 10. More particularly, chew toy 10 may be formed by first molding flanking end portion(s) 40 in a first mold from a first material composition, such as by injection molding. Thereafter, flanking end portion(s) 40 may be inserted into a second mold wherein a second material composition may be introduced to form the central shaft portion 30, while at the same time, the second material composition flows into internal cavity 42 to form projection(s) 37 to mechanically lock the flanking end portion(s) 40 to the central shaft portion 30. Similar to the flanking end portion 40, the central shaft portion 30 may also be formed by injection molding.

Figure 4:
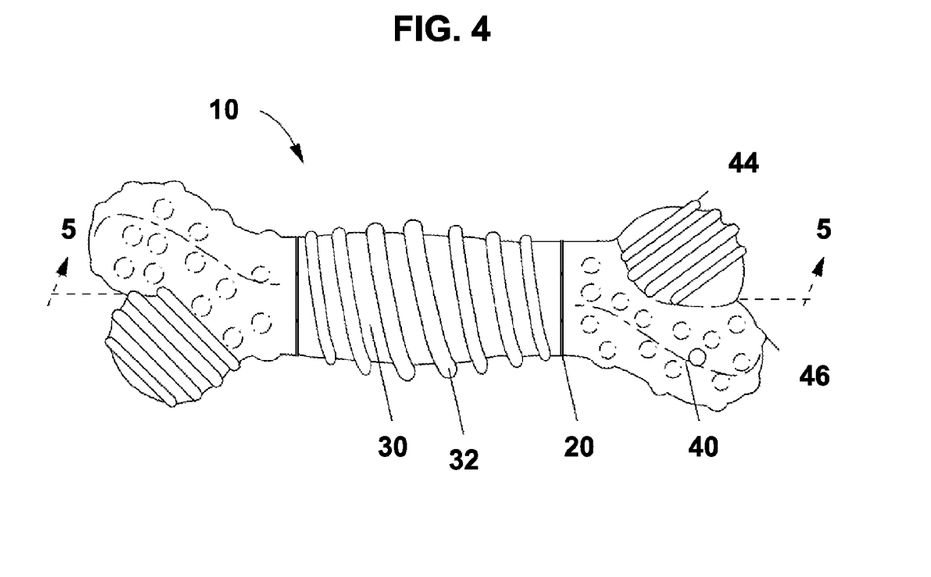
FIG. 4 is a side view of a pet chew toy 10 according to a second embodiment of the present disclosure.
Figure 5:
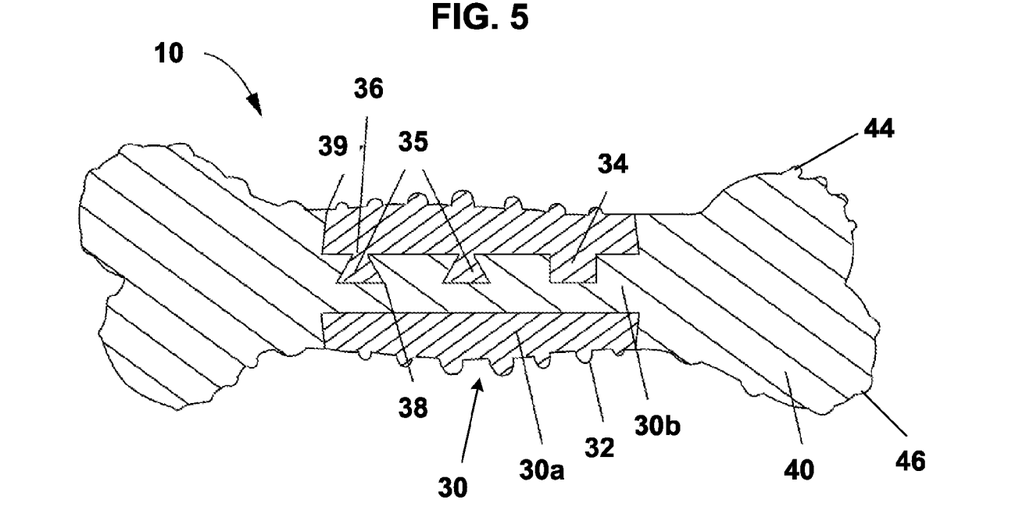
FIG. 5 is a cross-sectional view of the pet chew toy 10 of FIG. 4 taken along line 5-5.

In another embodiment of the chew toy 10, shown in FIGS. 4-5, the central shaft portion 30 and/or flanking end portions 40 may optionally include a plurality of protrusions 32, 44 and 46 which may interact with the teeth of an animal that may use with the pet chew toy 10. The protrusions 32, 44 and 46 may be of similar or varying geometry. The protrusions 32, 44 and 46 may have a diameter or thickness equal to or smaller than the diameter or thickness of the central shaft portion 30. The protrusions may be in the form of ribs 32, 44 or pins 46 and have a profile which is, for instance, round, square, triangular, rectangular, hexagonal, etc. The protrusions 32 44 and 46 may be may not be limited in the manner in which they are disposed, for instance, radially, axially or circumferentially.

As shown in FIG. 5, in contrast to the first embodiment, the first material composition used to form flanking end portion(s) 40 may extend across the length of central shaft portion 30 and provide an inner bridge 30b of the central shaft portion 30 connecting the opposing flanking end portions 40. As shown, the inner bridge 30b may be provide with one or more blind hole recesses 34 which may be filled by the second material composition forming the outer covering 30a of the central shaft portion 30 to lock the second material composition to the first material composition. Such blind hole recesses 34 may be defined as recesses that do not project fully through the inner bridge 30b. Further, as shown in FIG. 5, the blind hole recesses 34 may be undercut or die-locked to further improve retention of the second material composition to the first material composition.

More particularly, as shown at 35, some or all of these blind hole recesses 34 may include an undercut or die-locked condition whereby the cross-sectional dimensions of the blind hole recess 35 are less at some point proximal to the bottom 36 of the blind hole recess 35 than at the bottom of the blind hole recess 38. By this condition, when the second material composition is molded into the blind hole recesses 35 of the inner bridge 30b, the second material composition forming the outer covering 30a may be mechanically locked therein and difficult to remove. In addition, the joint 39 between the first material composition forming the flanking end portions 40 and the second material composition forming the outer covering 30a of the central shaft portion 30 may include undercut or die-locked sections as shown, to further aid in retaining the outer covering 30a of the central shaft portion 30 to the inner bridge 30b.

It should also be appreciated that by selectively placing the blind hole recesses 34, as shown, on inner bridge 30b of central shaft portion 30, one may selectively surround and effectively connect the outer covering 30a of the central shaft portion 30 which, as noted, has a different material composition from the first material composition used for the flanking end portions 40 and inner bridge 30b. In addition, given the application with respect to chewing by the animal, it can be appreciated that the use of blind hole recesses 34, 35 may ensure that the outer covering 30a is not easily removed from the inner bridge 30b of the central shaft portion 30 of the chew toy 10. In those situations where the second material composition is relatively softer than the first material composition, this may then provide for a relatively more durable pet chew toy 10.

While the forgoing provides two exemplary embodiments of a pet chew toy 10 according to the present disclosure, it should be appreciated that the animal chew toy 10 may not be limited to the shape of a dog bone, but may have any shape that may be conducive to interaction with an animal to provide a chewing experience. For instance, the pet chew toy 10 may be in the configuration of, but not limited to, a fish, spare ribs, a steak or a hair brush.

The first material composition used to form the flanking end portion(s) 40 (and the inner bridge 30b of the second embodiment) may comprise one or more polyamide polymers. More particularly, the one or more polyamide polymers may comprise a polyamide copolymer (a polymer formed from two or more different monomers producing two or more different polyamide segments within the polymer chain). More specifically, as discussed more fully herein, the polyamide copolymer is preferably a terpolymer of three (3) different polyamide segments which serve to depress the observed Tm of the copolymer composition. Additionally, the first material composition may comprise, consist essentially of, or consist of a blend of the terpolymer with at least one elastomer, such as a diene rubber (e.g. polybutadiene or polyisoprene). A particularly preferred example of a diene rubber is natural rubber (cis-1,4-polyisoprene).

As shown in Table 1, one example of a polyamide terpolymer herein may be preferably obtained from Jian Dong Rubber Products Co., Ltd of China with the following physical properties. The polyamide structures are identified below and amount to a terpolymer of PA-6, PA1212 and PA-6 (i.e. the repeating units as shown are covalently linked into a terpolymer structure).

TABLE 1

Polyamide Terpolymer
Manufacturer Jian Dong Rubber Products Co., Ltd.
Grade L1304
Material Type Polyamide Terpolymer

| Property | Unit | Value |
| --- | --- | --- |
| Density | g/cm³ | 1.05 |
| Melting Temperature | ° C. | 125 |
| Viscosity | mPa · s (Millipascal second) | 2 |
| Melt Flow Rate | g/10 min. | 40 |
| Water Absorption | % | ≤1.2 |
| Shrinkage | Mm/mm | 1 |
| Drying time/temperature | ° C./hr. | 120/8 |
| Transformation Temp., 0.45/1.81 | Mpa/° C. | 90 |
| Tensile Strength | Mpa | 85 |
| Breaking Strength | Mpa | 80 |
| Flexural Strength | Mpa | 75 |
| Flexural Modulus | Mpa | 1500 |
| Impact Strength | J/m | 120 |
| Flame Resistance | | UL HB |
| Particle | T * 2.54 | 10-150 |

To provide the first material composition, the polyamide terpolymer and the elastomer, such as a diene rubber such as natural rubber, may be first melt mixed together. Exemplary formulations to produce the first material composition is shown in Table 2, in which the natural rubber may initially be in an uncured state.

TABLE 2

| Sample | Component | Ingredient | % Weight (50:50) | % Weight (80:20) | % Weight (70:30) |
| --- | --- | --- | --- | --- | --- |
| 1 | Base Polymer | Natural Rubber | 32.00 | 13.11 | 19.51 |
| 2 | Base Polymer | Polyamide terpolymer | 32.00 | 52.42 | 45.51 |
| 3 | Cure activator/accelerator | Zinc Oxide | 3.00 | 3.28 | 3.25 |
| 4 | Cure Activator | Stearic Acid | 0.60 | 0.66 | 0.65 |
| 5 | Reinforcing agent | White carbon | 12.36 | 7.86 | 9.75 |
| 6 | Mineral/filler | Calcium carbonate | 12.36 | 14.42 | 13.65 |
| 7 | Lubricant | Polyethylene glycol 4000 | 1.00 | 0.66 | 0.65 |

TABLE 2-continued

| Sample | Component | Ingredient | % Weight (50:50) | % Weight (80:20) | % Weight (70:30) |
| --- | --- | --- | --- | --- | --- |
| 8 | Curing Agent | N—N-m-phenylene bismaleimide | 1.30 | 1.31 | 1.30 |
| 9 | Curing Agent | Sulfur | 1.00 | 0.79 | 0.85 |
| 10 | Processing Aid | Highflow | 1.27 | 0.98 | 1.04 |
| 11 | Plasticizer | Parrafin oil (with aromatic scent) | 1.96 | 3.28 | 2.60 |
| 12 | Promoter | N-cyclohexyl-2-benothiazole sulfonamide | 0.95 | 0.98 | 0.98 |
| 13 | Promotor | Disulfide generation tetrmethyl thiuram | 0.20 | 0.26 | 0.26 |

In the above Table 2, reference to the 50:50 formulation is reference to the use of equal amounts (32.00% by weight) of natural rubber (cis-1,4-polyisoprene) and the polyamide terpolymer. Reference to the 80:20 formulation is reference to the use of 52.42% by weight polyamide terpolymer and 13.11% by weight natural rubber. Reference to the 70:30 formulation is reference to the use of 45.51% by weight polyamide terpolymer and 19.51% by weight natural rubber. As may also be appreciated, the nylon terpolymer and the natural rubber may be the two base polymeric ingredients of the composition and each be present at a weight percent greater than any other polymeric ingredient (e.g. the lubricant such as polyethylene glycol).

Accordingly, while the polyamide terpolymer and the natural rubber are shown in Table 2 in one example to be equally provided at 32% by weight of the full composition, the percentages of the polyamide terpolymer and the natural rubber in the composition may not in combination be necessarily equal to or limited to 64%. For example, the polyamide terpolymer may be in a range between 30% to 95% by weight of the entire composition, more preferably 50% to 95% of the composition. The rubber, on the other hand, may be present at 5% to 50% by weight of the full composition. This particular polyamide terpolymer/elastomer blend composition may be preferably utilized to form the end portions of a pet chew, where as discussed more fully below, relatively harder and relatively more rigid characteristics are desired.

When the polyamide terpolymer and elastomer (e.g. cis-1,4-polyisoprene) are both present, the variable to also consider is the preferred weight ratio of the two polymeric components relative to one another. In that regard, the weight ratio of the two polymeric components may range from 1:10 by weight (i.e. 1 part elastomer to 10 parts polyamide), 1:9, 1:8, 1:7, 1:6, 1:5, 1:4, 1:3, and 1:2 and 1:1 (i.e. equal parts by weight elastomer to polyamide). As noted above in Table 2, the polyamide is preferably present at 32% by weight of the entire formulation and the elastomer is present at 32% by weight, therein providing the situation wherein the polyamide terpolymer and elastomer are, with respect to one another, present at a 1:1 weight ratio.

Turning to the manufacture the first material composition to the foregoing formulation shown in Table 2, the polyamide terpolymer may be first dried to remove moisture, such as in an oven or other drying device for a suitable period of time. Thereafter, polyamide terpolymer and the elastomer (e.g. natural rubber) may be added to an intensive (high shear) mixing apparatus, which may be particularly constructed to mix rubber containing compounds which exhibit properties of non-Newtonian fluids. The mixing apparatus may particularly be an internal mixer, in which mechanical work, heat and pressure are applied simultaneously to the polymer materials. One type of internal mixer may be understood to comprise a mixing chamber comprising two adjacent cylindrical chambers in which the materials are deformed by contra-rotating blades or rotors in each chamber. The chambers and rotors may be arranged for heating or cooling to control the batch temperature. The mixing chamber may be jacketed or otherwise arranged for cooling, and may be provided with a feeding hopper which can be closed by means of a pneumatically operated vertical ram. Examples of intensive mixers may include kneading machines, such as from Banbury and Kneading Machinery which may have an intermeshing or tangential rotor design.

In the mixing apparatus, the polyamide terpolymer and the natural rubber may be mixed under suitable conditions to provide a homogeneous (uniform) dispersion of the natural rubber in the polyamide in a melt state. Furthermore, the material may be processed such that the natural rubber is masticated, i.e. reduction in elasticity occurring when rubber is intensively worked as to reduce the molecular weight thereof. For example, during mixing, the polyamide and the natural rubber may be mixed in a temperature range of 130° C. for 15 minutes, and more particularly at 130° C. for 15 minutes.

Thereafter, once the polyamide terpolymer and the natural rubber have been uniformly mixed and melt blended, the remaining ingredients of the first material composition may be added to the polyamide terpolymer and the rubber.

Once all the ingredients of the composition have been added to the mixing apparatus, the temperature of the composition may be increased to a temperature range of range of 150° C. for 20 minutes, and more particularly at 125-150° C. for 15 minutes to vulcanize (cross-link) the uncured natural rubber.

Uncured natural rubber may be understood as a thermoplastic material which easily undergoes permanent (inelastic) deformation when heat and pressure are applied thereto. In order to increase the elasticity of the material, the natural rubber may be cross-linked by vulcanization. Vulcanization may be understood as a generally irreversible chemical process for cross-linking uncured natural rubber with one or more curatives, which may collectively be referred to as a curative package. The curative package modifies the uncured natural rubber by forming cross-links (bridges) which link between the individual polymer chains of the rubber, thus inhibiting the polymer chains from moving independently and adding elasticity to the material.

The cross-linking may preferably be performed with sulfur, with the reactive (cure) sites being allylic hydrogen atoms of the natural rubber, positioned adjacent to carbon-carbon double bonds of the polymer chains. During vulcanization, some of the C—H bonds of a polymer chain may be replaced by chains of sulfur atoms that cross-link with a cure site of another polymer chain. The number of sulfur atoms of the cross-link may then influence the physical properties of the cured rubber, with short cross-links associated with the better heat resistance and longer cross-link associated with better dynamic (e.g. flex) properties. It is also contemplated herein the crosslinking may be achieved by introduction of free-radical initiators and formation of free-radicals through heating, which may then crosslink the unsaturated diene polymer such as the diene polymer of natural rubber.

The sulfur by itself may therefore be understood as a relatively slow vulcanizing agent. Consequently, vulcanization (cure) activators and accelerators may be used in combination with the sulfur, such as zinc oxide and stearic acid, as part of the cure package to increase cross-linking efficiency, as well as increase physical properties of the cured rubber.

It should be understood that after the rubber cures, the polyamide terpolymer/rubber material composition transforms from a blend of two thermoplastic polymer materials to a blend of thermoplastic polyamide terpolymer and thermoset rubber polymer materials. The polyamide terpolymer and the rubber may also be understood to be immiscible in one another such that, upon their mixture, two distinct phases are created, with the polyamide terpolymer forming the matrix or continuous phase domain in which the rubber phase forms the discontinuous phase domain and is dispersed as isolated volumes (i.e. surrounded by the continuous phase but isolated from one another within the mixture). However, the rubber/polyamide material composition remains a melt flowable composition due to the presence of the thermoplastic polyamide terpolymer.

Upon proper cure of the rubber in the intensive mixer, the mixed composition may be cooled to a to a temperature range of range of 120° C. and discharged from the mixer as a mass.

The mass may be discharged or transported directly onto a mill, such as a two-roll mill, for additional mixing and/or shaping of the mass into a sheet having a thickness in a range of 25-30 mm. The mill may include two horizontally-disposed, parallel rollers that contra-rotate relative to one another. The mixed mass may be fed between the two rollers at a nip point. The rollers may be temperature controlled to process the mixed mass at a temperature in a range of 60-90° C. The sheet may have a thickness in a range of 10-50 mm. Upon exiting the rollers, the sheet may be slit into narrow strips having a width in a range of 1-50 mm.

The foregoing polyamide/rubber material composition may now be used as the first material composition for subsequent molding of the chew toys 10 such as by injection molding, particularly by having the strips of material introduced directly into the hopper of an injection molding machine.

As set forth above, one preferred polyamide terpolymer has a melt temperature of 125° C. This melt temperature may allow mastication of the natural rubber to occur with reduced likelihood of thermal degradation as may be ordinarily associated with higher mastication temperatures.

Figure 6:
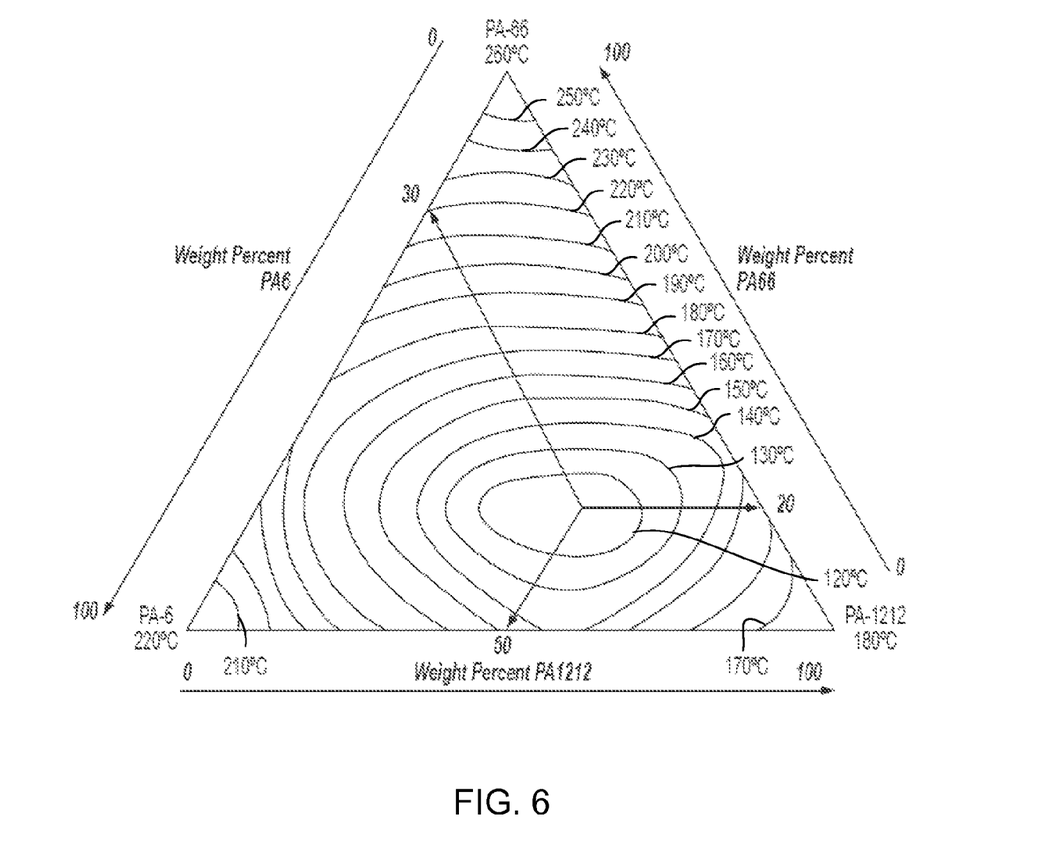
FIG. 6 is a a melt temperature plot for a polyamide terpolymer formed of polyamide-6; polyamide-6,6; and polyamide-6,12 segments.

Referring now to FIG. 6, there is shown a melt temperature plot for a polyamide terpolymer formed of polyamide-6; polyamide-6,6; and polyamide-6,12 segments. That is, the isothermal melting temperature lines are identified. As shown, the melt temperature of a terpolymer containing PA6, PA66 and PA1212 varies based on the indicated percentage of each individual polyamide segment within the copolymer. As shown, the polyamide-6 segments on their own may be understood to have a melting temperature of 220° C., the polyamide-6,6 segments on their own may be understood to have a melting temperature of 260° C.; and the polyamide 1212 segments on their own may be understood to have a melting temperature of 183° C.

However, as shown, the melting temperature decreases when various percentages of each segment are employed and combined into a terpolymer. For example, as illustrated for a composition containing 30% PA6, 20% PA66 and 50% PA1212, the Tm is observed to be 120° C. Without being bound by theory, it is believed that the random terpolymer polyamide structure is such that the individual homopolymer polyamide segments may interfere with the ability of each segment to fully crystallize, thereby driving the observed Tm down to the now identified temperatures. In any event, the reduced Tm is now advantageously utilized to form the identified polyamide-elastomeric blends herein as applied to pet chew toy construction. The reduced Tm of the polyamide terpolymer may therefore fall in the range of 120° C. to 250° C., more preferably from 120° C. to 200° C., and more preferably from 120° C. to 150° C.

The second material composition used to form the central shaft portion 30, may also be formed of an elastomer, such as a diene rubber, and preferably natural rubber (cis-1,4-polyisoprene). It is useful to therefore note that in general, the elastomer herein (including the elastomer for the first composition discussed herein) may be understood as any material with a Tg below room temperature and which is at most, 50% crystalline (i.e., the material contains an amorphous phase of 50% or greater, up to 100% amorphous phase). The elastomer may also be characterized as having the ability to elongate 100% or more and after 1 minute at 100% elongation, recover to 90% or more of the original dimensions. Furthermore, in contrast to the first material composition used to form the flanking end portion(s) 40 (and the inner bridge 30b of the second embodiment), the second material composition may be formed completely of the elastomer.

The second material composition also is one that preferably comprises relatively more elastomer such as natural rubber than the first material composition (e.g. greater than 50% by weight of the composition noted above). In the second composition, the elastomer may therefore be present at levels greater than 50% by weight and up to 75% by weight of the entire pet chew toy, particular when relatively softer and more elastic features are desired for a central location on a pet chew, as opposed to an end portion.

Accordingly, the first material composition may have a first hardness, flexural modulus or tensile strength which is different from the corresponding values for the second material composition. For example, the first material composition forming the flanking end portion(s) 40 may have a Shore A durometer hardness, as measured by ASTM D2240-05 (2010), of greater than 70, including all values and increments therein up to 100, e.g. 80, 90, etc. The second material composition forming the central shaft portion 30 (first embodiment or 30a (second embodiment) may have a Shore A durometer of less than 65, including all values and increments therein, including less than 60, less than 50 and less than 40. Therefore, the Shore durometer hardness of the first composition may be higher than the Shore durometer hardness of the second composition.

In addition, the first material composition forming the flanking end portion(s) 40 preferably has a flexural modulus, as measured by ASTM D790-10, of greater than 100,000 psi. The second material composition forming the central shaft portion 30 may preferably have a flexural modulus of less than 90,000 psi., including all values and increments therein, including less than 80,000 psi, less than 60,000 psi. and less than 40,000 psi..

Along such lines, it may be appreciated that the first material composition and the second material composition may be tailored to provide a pet chew toy 10 with differing hardness and flexibility in differing locations. In that regard, each is based upon a blend of polyamide terpolymer, as described herein, in combination with an elastomer, which elastomer is preferably cis-1,4-polyisoprene, which is then vulcanized and crosslinked.

Moreover, in order to optimize the bonding of the first material composition forming the flanking end portion(s) 40 (and the inner bridge 30b of the second embodiment) with the second material composition forming the central shaft portion 30, the compositions may also be selected so that during molding, the surface of the first material composition may melt or soften a sufficient amount in the presence of the second material composition so that the materials tend to melt bond.

Suitable bonding may also be provided by utilizing mechanical interference between the first material composition and the second material composition. For example, as set forth above, the second material composition may form a mechanical interference with the first material composition upon flowing into the internal cavity 42 of flanking end portion(s) 40 or flowing into the recess(es) 34 of inner bridge 30b. In both situations, the second material composition may flow from the entrance opening into a cavity which expands thereafter to form a mechanical lock which projection 37.

The first and/or second material compositions may also incorporate an attractant. The attractant may be present at a level of between 0.1% to 10% by weight of the composition, including all ranges and increments therein. The attractant may be an olfactory stimulant or a flavoring. Exemplary attractants may include the meal or by-products of fish, meat, poultry, etc. In addition, the attractants may include animal digests. By animal digest it is meant to include a substance made by taking relatively clean and relatively undercomposed animal tissue and breaking it down utilizing chemical or enzymatic hydrolysis. The animal digest may include hydrolyzed liver, e.g., hydrolyzed poultry liver. In addition, the animal digests may not contain hair, horn, teeth, hooves or feathers, which may be present in unavoidable trace amounts. The animal digests may be obtained, for example, from Applied Food Biotechnology Incorporated, O'Fallon, Mo., and sold under the trade name Optimizor. The attractants may be provided in a number of forms such as liquid or powder. It may also be provided as a concentrate.

An exemplary method of forming the pet chew toy 10 of the first embodiment, may include molding the flanking end portions 40 from the first material composition in a first molding apparatus comprising a first mold by a polymer melt conversion process such as injection molding, extrusion, injection-compression molding, blow molding and transfer molding. The flanking end portions 40 may then be placed in spaced apart relationship in a second molding apparatus comprising a second mold and the second material composition may be introduced therein to form the central shaft portion 30, such as by injection molding, during which time the second material composition flows into the cavities 42 of the flanking end portions 40 and forms projections 37 which mechanically lock therewith.

An exemplary method of forming the pet chew toy 10 of the second embodiment may include molding the flanking end portions 40 and inner bridge 30b of the central shaft portion 30 from the first material composition in a first molding apparatus comprising a first mold by a polymer melt conversion process such as injection molding, extrusion, injection-compression molding, blow molding and transfer molding. The flanking end portions 40 and inner bridge 30b may then be placed in a second molding apparatus comprising a second mold and the second material composition may be introduced therein to form the outer covering 30a of central shaft portion 30, such as by injection molding, during which time the second material composition flows into the blind hole recesses 34 of the inner bridge 30b central shaft portion 30.

The second material composition used to form the central shaft portion 30 (of the first embodiment) or the outer covering 30a (of the second embodiment) may particularly comprise an elastomer other than natural rubber. The elastomer may be comprised of any polymer, including natural or synthetic polymers, and thermoplastic or thermoset polymers. Thus, the elastomer may be either a natural or synthetic elastomer, and either a thermoplastic or thermoset elastomer. As used herein, an elastomer may be characterized as a material that has an elongation at 23° C. of at least 100%, and which, after being stretched to twice its original length and being held at such for one minute, may recover in a range of 50% to 100% within one minute after release from the stress. More particularly, the elastomer may recover in a range of 75% to 100% within one minute after release from the stress, and even more particularly recover in a range of 90% to 100% within one minute after release from the stress.

The elastomer may comprise, essentially consist of or consist of natural or synthetic rubber, which may include, acrylic rubber, butadiene rubber, butyl rubber, ethylene propylene rubber, ethylene propylene rubber diene monomer rubber, fluorocarbon rubber, isoprene rubber, nitrile rubber including hydrogenated nitrile rubber, polyurethane rubber, silicone rubber and styrene block copolymer (e.g. styrene butadiene rubber, styrene ethylene/butylene styrene rubber).

In certain embodiments, the second material composition used to form the central shaft portion 30 (of the first embodiment) or the outer covering 30a (of the second embodiment) may particularly comprise an edible resin composition, which may also be digestible. Edible resin compositions may include any starch or carbohydrate of natural or vegetable origin. The starch may include amylose and/or amylopectin and may be extracted from plants, including but not limited to potatoes, rice, tapioca, corn and cereals such as rye, wheat, and oats. The starch may also be extracted from fruits, nuts and rhizomes, or arrowroot, guar gum, locust bean, arracacha, buckwheat, banana, barley, cassaya, konjac, kudzu, oca, sago, sorghum, sweet potato, taro, yams, fava beans, lentils and peas. The starch may be present in the edible resin composition between 30-99% including all increments and values therebetween such as levels above 50%, 85%, etc.

The starch employed herein may be raw starch, which may be understood as starch that has not seen a prior thermal molding history, such as extrusion or other type of melt processing step where the resin is shaped in the presence of heat. The raw starch itself may also be native, which may be understood as unmodified starch recovered in the original form by extraction and not physically or chemically modified. The raw starch may also be in powder form of varying particle size, which may be in the range of 100-2000 μm including all ranges and increments therein. Raw starch may be understood as milled and/or pre-sifted starch. It should be understood that the raw starch may also have varying degrees of moisture present. In one embodiment moisture may be present in the raw starch between 1-60%, including all increments and values therebetween such as 40%, 20%, 10%, etc.

The edible resin compositions herein may be sourced from Manildra Group USA, under the following tradenames: "GEMSTAR 100" which is a refined food grade wheat starch; "GEMSTAR100+" which is a refined food grade wheat starch; "GEM OF THE WEST VITAL WHEAT GLUTEN" which is a powder product by low temperature drying of gluten extracted from wheat flour; "ORGANIC GEM OF THE WEST VITAL WHEAT GLUTEN" which is a powder product by low temperature drying of gluten extracted from organic wheat flour; "ORGANIC GEMSTAR 100" which is a wheat starch extracted from organic what flour; and/or "ORGANIC GEMGEL 100" which is a pregelatinized organic wheat starch In addition, the resin composition may be sourced from ADM under the tradename "EDIGEL 100" which is a wheat resin composition; "AYTEX P" which is a unmodified food grade wheat starch.

Other edible resin materials may be contemplated that may be derived from animal sources such as casein, denatured or hydrolyzed casein, collagen, denatured or hydrolyzed collagen, rawhide, gelatin, other animal protein products, such as animal meal. The resin material may also be derived from plant matter such as gluten, vegetable matter, nuts, such as nut flour, paste or bits, fruit matter, etc. It should also be appreciated that the various edible resin materials, (i.e. starch, animal derived sources, and plant derived sources) may be blended with other edible resin compositions, thermoplastic materials, and/or thermoset materials.

For example, glutens may be incorporated into the edible resin composition. Gluten may be understood as water-insoluble protein complex extracted from cereal grains such as maize or corn and wheat. The gluten may be present individually or cumulatively between 0.1-50% by weight of the resin composition and all increments and values therebetween including 0.1-5.0%, 15%, 25%, etc.

In addition various additives may be incorporated into the edible resin compositions. For example, the edible resin compositions may include cellulose. The cellulose may be, for example, a long-chain polymer of polysaccharide carbohydrate. The cellulose may also be derived or extracted from plants. The cellulose may be incorporated into the resin composition between 1-15% by weight of the resin composition and any increment or value therebetween including 4%, 10%, 11%, etc.

Emulsifiers or surfactants may also be incorporated into the edible resin compositions. The emulsifier may be present between 1-10% by weight of the resin composition and all increments or values therebetween including 3%, 4%, etc. The emulsifier may include, for example, lecithin, which may be extracted or derived from, for example, egg yolk or soy beans.

The edible resin compositions may also include a plasticizer. The plasticizer may include for example, glycerin. The plasticizer may be incorporated between 15-30%, including all increments and values therebetween such as levels greater than 15%, 21%, 27% etc.

A humectant may also be incorporated into the edible resin composition. The humectant may include, for example, oat fiber. The humectant may be incorporated between 0.1-5% by weight of the resin composition including all intervals and values therebetween, including 1%, 25%, etc. A humectant may be understood to be any additive that may absorb water in the material.

The edible resin composition may also include water. The water may be introduced into the composition between 1-40% by weight of the edible resin compositions and any increment or value therebetween, including 4%, 20-40%, 10-20%, etc. After the product has been formed, the water may be present between 1-20% by weight of the resin composition including all increments or values therebetween, such as, below 20%, 4%, 5-10%, etc.

The edible resin composition may include a nutraceutical. The nutraceutical may be fermented soya. Fermented soya nutraceuticals are available from Bio Food, Ltd., Pine Brook, N.J. and sold under the general trademark Soynatto®. The fermented soya may be present between 1-40% by weight of the resin composition, including all increments and values therebetween, including 10%, 20%, etc.

The edible resin composition may also include enzymes and/or co-enzymes which are similarly available through Bio Foods, Ltd., Pine Brook, N.J. and sold under the trademark of BT-CoQ10™. This reportedly is a biologically transformed (fermented) cell mitochondrial coenzyme and contains Coenzyme Q10, antioxidants, phytonutrients and cofactor mineral nutrients and other cell constituents. The enzymes and/or co-enzymes may be present between 0.1-10% by weight of the resin composition, including all increments and values therebetween such as 1%, 5%, etc.

In addition, herbal extracts, vitamins, minerals, colorants, yeast products, soy products, attractants, etc., may also be incorporated into the edible resin composition. Yeast products, for example, may include nutritional yeast or brewers yeast such as *Saccharomyces cerevisiae*, dairy yeast such as *Kluyveromyce marxianus* or wine yeast such as *Saccharomyces fermentati*.

The ingredients for the edible resin composition may be compounded in an extruder and fed to an injection molding machine which may mold the edible resin composition into central shaft portion 30. In addition, the second material composition 50 may be forced into the blind holes 60 in the outer surface of the shaft portion 20 to assist in adhesion of the overlying second material composition 50. The second material composition 50 may be admixed with water in a desired amount (e.g. up to 50% by weight) to facilitate molding. Molding of the edible resin composition may be carried out according to the teachings of U.S. application Ser. No. 11/747,132 which is commonly assigned to the assignee of the present disclosure and included herein in its entirely by reference.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

What is claimed is:

1. A method of making a pet chew toy comprising:
providing a first material composition having a first Shore durometer hardness, the first material composition comprising a blend containing a polyamide terpolymer and a diene elastomer, wherein the polyamide terpolymer is formed of three different polyamide segments and has a melt temperature in a range of 120° C. to 250° C., and wherein the diene elastomer is crosslinked;
providing a second material composition having a second Shore durometer hardness, the first Shore durometer hardness of the first material composition being higher than the second Shore durometer hardness of the second material composition, the second material composition comprising an elastomer;
forming two end portions of the pet chew toy with the first material composition; and
forming a central shaft portion of the pet chew toy with the second material composition, wherein the central shaft portion is joined to each end portion.

2. The method of claim 1 wherein:
forming the two end portions and the central shaft portion of the pet chew toy are each performed by injection molding.

3. The method of claim 1 wherein:
forming the two end portions of the pet chew toy with the first material composition is performed in a first molding apparatus; and
providing the first material composition comprising the polyamide terpolymer and the diene elastomer further comprises mixing the polyamide terpolymer and the diene elastomer in a mixing apparatus prior to an introduction of the first material composition to the first molding apparatus.

4. The method of claim 3 wherein:
mixing the polyamide terpolymer and the diene elastomer in the mixing apparatus further includes cross-linking the first material composition comprising the polyamide terpolymer and the diene elastomer in the mixing apparatus.

5. The method of claim 3 wherein:
providing the first material composition comprising the polyamide terpolymer and the diene elastomer further comprises forming the first material composition comprising the polyamide terpolymer and the diene elastomer into a sheet after mixing the polyamide terpolymer and the diene elastomer in the mixing apparatus and cutting the sheet into smaller sections prior to the introduction of the first material composition to the first molding apparatus.

6. The method of claim 3 wherein:
the first molding apparatus is an injection molding apparatus.

7. The method of claim 3 wherein:
the mixing apparatus is an intensive mixing apparatus.

8. The method of claim 3 wherein:
forming the central shaft portion of the pet chew toy with the second material composition is performed in a second molding apparatus.

9. The method of claim 8 wherein:
the second molding apparatus is an injection molding apparatus.

10. The method of claim 3 wherein:
the central shaft portion is joined to each end portion by at least one of melt bonding and by a mechanical lock.

11. The method of claim 1 wherein:
the polyamide terpolymer has a melt temperature in a range of 120° C. to 200° C.

12. The method of claim 1 wherein:
the polyamide terpolymer has a melt temperature in a range of 120° C. to 150° C.

13. The method of claim 1 wherein:
the polyamide terpolymer comprises a terpolymer of the following three polyamide homopolymer segments:

14. The method of claim 1 wherein:
the polyamide terpolymer is in a range of 30% by weight to 95% by weight of the first material composition.

15. The method of claim 1 wherein:
the diene elastomer is in a range of 5% by weight to 50% by weight of the first material composition.

16. The method of claim 1 wherein:
the polyamide terpolymer and the diene elastomer of the first material composition are each present at a selected weight ratio, and the weight ratio of the diene elastomer to the polyamide terpolymer is 1:10 to 1:1.

17. The method of claim 1 wherein:
the diene elastomer of the first material composition comprises cis-1,4-polyisoprene.

18. The method of claim 1 wherein:
the first Shore durometer hardness of the first material composition is a Shore A durometer hardness greater than 70.

19. The method of claim 1 wherein:
the second Shore durometer hardness of the second material composition is a Shore A durometer hardness less than 65.

* * * * *